United States Patent Office 3,394,191
Patented July 23, 1968

3,394,191
PHENYL β-NITROSTYRYL SULFIDES
Marvin L. Oftedahl, Crestwood, Mo., assignor to Monsanto Company, St. Louis, Mo., a corporation of Delaware
No Drawing. Filed Feb. 9, 1966, Ser. No. 526,078
8 Claims. (Cl. 260—609)

This invention relates to a novel class of phenyl β-nitrostyryl sulfides and derivatives thereof. More particularly, this invention is concerned with a new class of organic compounds which are halo, trifluoromethyl, or nitro, phenyl β-nitrostyryl sulfides and the method for preparing said compounds. Such compounds are found to possess useful and unexpected biological activity.

The novel compounds of this invention have the general formula

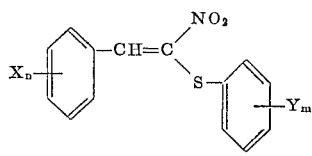

where X is selected from a group consisting of chlorine, bromine, $CF_3$ and $NO_2$, and $n$ is an integer from 0 to 3; Y is selected from a group consisting of chlorine, bromine, $NO_2$, and $m$ is an integer from 0 to 3; and the sum of $m+n$ is at least one.

This class of compounds can be prepared by reacting a suitable benzenesulfenyl halide with a suitable β-nitrostyrene in a solvent such as acetic acid. The reactants are usually heated to the reflux temperature of the solvent, although the reaction may be carried out at room temperature. After the reaction is complete, the mixture is poured into ice water and the precipitate recovered.

A typical illustrative reaction for preparing a compound of this invention is shown in the following equation:

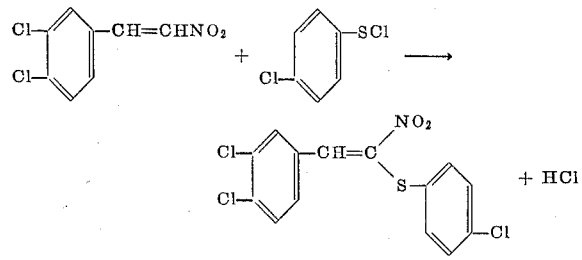

The invention will be more fully understood by reference to the following examples which are set forth herein solely for the purpose of illustration, and which are not to be construed as limiting the scope of the present invention.

Example 1

A suitable reaction vessel is charged with 3.6 grams (0.02 mol) of p-chlorobenzenesulfenyl chloride in 50 ml. glacial acetic acid. There is then added 4.4 grams (0.02 mol) of 3,4-dichloro-β-nitrostyrene, and the solution heated to reflux temperature, held at that temperature for two hours, and then allowed to stand for about 12 hours. The reaction mass is then poured into ice water, and the resulting mixture is filtered to yield 7.2 g. of wet solid. Said solid is recrystallized from isopropyl alcohol. This product is identified as β-(p-chlorophenylthio)-β-nitro-3,4-dichlorostyrene.

Analysis.—Calculated for $C_{14}H_8Cl_3NO_2$; Cl, 29.5. Found: Cl, 29.8.

Example 2

Following the detailed procedure set forth in Example 1, the reactants employed are 4.47 grams (0.02 mol) of p-bromobenzenesulfenyl chloride and 4.56 grams (0.02 mol) of m-bromo-β-nitrostyrene. The product obtained is β-(p-bromophenylthio)-β-nitro-m-bromostyrene.

Example 3

Following the detailed procedure set forth in Example 1, the reactants employed are 4.69 grams (0.02 mol) of 2,4-dinitrobenzenesulfenyl chloride and 6.14 grams (0.02 mol) of 3,4-dibromo-β-nitrostyrene. The product obtained is β-(2,4-dinitrophenylthio)-β-nitro-3,4-dibromostyrene.

Example 4

Following the detailed procedure set forth in Example 1, the reactants employed are 4.97 grams (0.02 mol) of 3,4,5-trichlorobenzenesulfenyl chloride and 4.34 grams (0.02 mol) of m-trifluoromethyl-β-nitrostyrene. The product obtained is β-(3,4,5-trichlorophenylthio)-β-nitro-m-trifluoromethylstyrene.

Example 5

Following the detailed procedure set forth in Example 1, the reactants employed are 2.89 grams (0.02 mol) of benzenesulphenyl chloride and 4.34 grams (0.02 mol) of m-trifluoromethyl β-nitrostyrene. The product obtained is β-(phenylthio)-β-nitro-m-trifluoromethylstyrene.

Example 6

Following the detailed procedure set forth in Example 1, the reactants employed are 4.97 grams (0.02 mol) of 3,4,5-trichlorobenzenesulphenyl chloride and 6.14 grams (0.02 mol) of 3,4-dibromo-β-nitrostyrene. The product obtained is β-(3,4,5-trichlorophenylthio)-β-nitro-3,4-dibromostyrene.

The products of the present invention are useful microbiocides adapted for use in the control of bacterial and fungal organisms. In a representative test, β-(p-chlorophenylthio)-β-nitro-3,4-dichlorostyrene is found to be active against *Staphylococcus aureus*, *Salmonella typhosa* and *Aspergillus niger* at a dilution of one part per one-hundred-thousand respectively. Similar activity is displayed by other and different phenyl β-nitrostyryl sulfides of this invention.

While the invention has been described herein by means of several specific examples, it is not so limited. It is to be understood that modifications and variations of the invention, obvious to those skilled in the art, may be made without departing from the spirit and scope of said invention.

The embodiments of the invention in which an exclusive property or privilege is claimed are defined as follows:

1. A compound of the formula

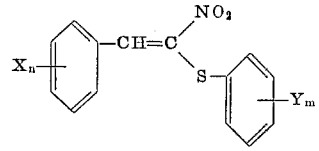

where X is selected from a group consisting of chlorine, bromine, $CF_3$ and $NO_2$, and $n$ is an integer from 0 to 3; Y is selected from a group consisting of chlorine, bromine and $NO_2$, and $m$ is an integer from 0 to 3; and the sum of $m+n$ is at least one.

2. An invention as defined in claim 1 wherein X and Y are each chlorine.

3. An invention as defined in claim 1 wherein X and Y are each bromine.

4. An invention as defined in claim 1 wherein X and Y are each $NO_2$.

5. An invention as defined in claim 1 wherein X and Y are each $CF_3$.

6. An invention as defined in claim 1 wherein the compound is β-(p-chlorophenylthio)-β-nitro-3,4-dichlorostyrene.

7. An invention as defined in claim 1 wherein the compound is β-(p-trifluoromethylphenylthio)-β-nitro-3,4-dichlorostyrene.

8. An invention as defined in claim 1 wherein the compound is β-(p-bromophenylthio)-β-nitro-3,4-dibromostyrene.

References Cited

Brookes et al.: Chemical Abstracts, vol. 52, p. 4543 (1952).

Kharasch et al.: Chemical Abstracts, vol. 60, p. 15,700 (1964).

CHARLES B. PARKER, *Primary Examiner.*

D. R. PHILLIPS, *Assistant Examiner.*